Sept. 8, 1964    G. W. WARNER    3,147,922
SPRAYER SYSTEM
Filed May 1, 1961
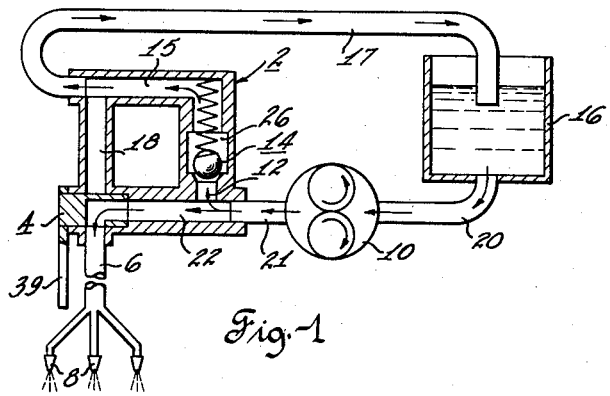
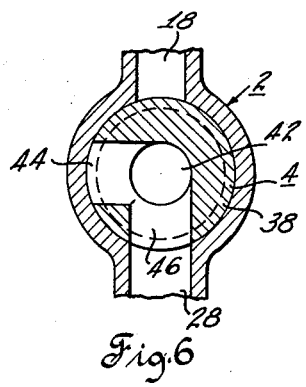
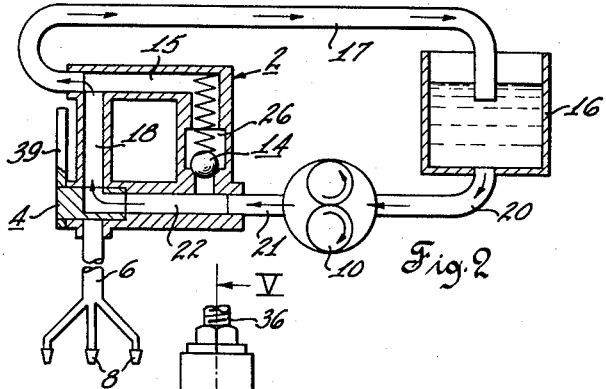
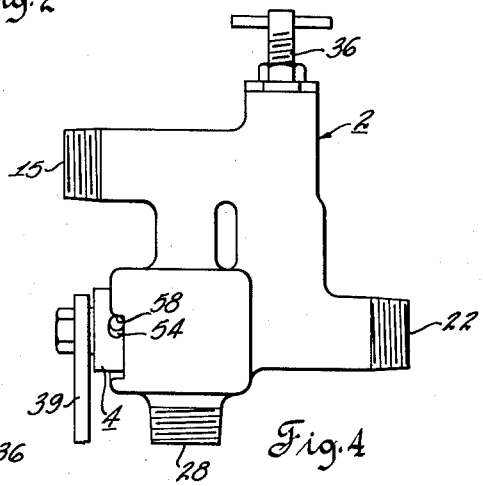
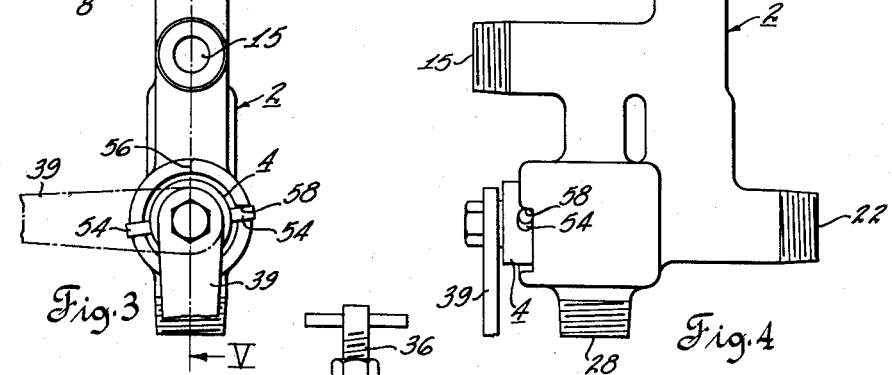
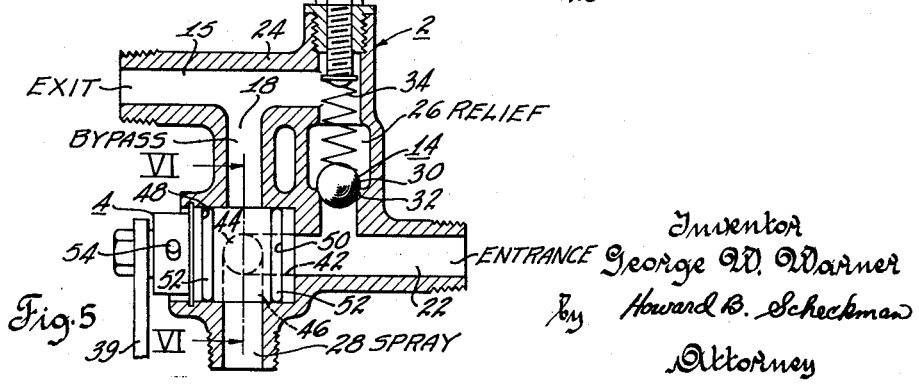
Inventor
George W. Warner
by Howard B. Scheckman
Attorney United States Patent Office 3,147,922
Patented Sept. 8, 1964

3,147,922
SPRAYER SYSTEM
George William Warner, La Crosse, Wis., assignor to Allis-Chalmers Manufacturing Company, Milwaukee, Wis.
Filed May 1, 1961, Ser. No. 106,774
2 Claims. (Cl. 239—127)

This invention relates to agriculture and more particularly to apparatus for applying fluids to soils in which crops are grown.

In liquid sprayers, it is normally desirable to continuously operate the fluid supply pump and feed back a portion of the fluid. This is to constantly agitate the fluid mixture being applied to the soil to prevent stratification or settling out of the solid or fluid material. This agitation provides an equal mixture of the chemicals and assures a uniform spray.

To agitate the fluid, the sprayer circuit is normally provided with a pressure relief valve that is set to shunt a selected portion of fluid back to the supply reservoir. Normally, at least 25 percent of the fluid is circulated back to the reservoir.

When the spray is shut off, it is common to continue to operate the fluid supply pump to maintain the fluid agitated so the spray will be immediately available. In this case all of the fluid from the supply pump passes through the pressure relief valve and circulates back to the supply reservoir.

However, the above system is hard on the individual elements and shortens their life. The reason is that the supply pump always has to work against the pressure that is needed to open the pressure relief valve. This pressure increases the wear on the pump and shortens its life expectancy.

The pressure relief valve, and the entire system in general wears due to the system being continuously operated under pressure. Further, as the relief pressure increases, the wear on the pump and valve parts increases, and there is a greater chance for leaks to develop.

Also, because the spray fluid is expensive, it is desirable when spraying is stopped, that leakage from the nozzle be prevented.

It is an object of this invention to provide an agricultural apparatus for supplying fluid to the soil that increases the life of the elements of the spray circuit.

It is another object of this invention to provide an agricultural apparatus for supplying fluid to the soil that has less tendency to leak than previous type valves.

It is another object of this invention to provide an agricultural apparatus for supplying fluid to the soil that is simple and contains few moving parts, so it will be less affected by the caustic spray fluid.

Other advantages and objects will appear from the following description considered in conjunction with the attached drawings, in which:

FIG. 1 is a schematic view of the sprayer circuit showing the position of the shutoff valve when spraying;

FIG. 2 is a view that is similar to FIG. 1 but showing the shutoff valve in the closed position;

FIG. 3 is a plan view of the valve mechanism showing the stops to limit movement of the handle;

FIG. 4 is a side view of the valve mechanism of FIG. 3 showing the pressure relief valve regulator and various connections;

FIG. 5 is a sectional view of FIG. 3 taken in the direction of arrows V—V showing the various passages in the valve body; and FIG. 6 is a sectional view of FIG. 5 taken in the direction of arrows VI—VI showing the shutoff valve core.

*Invention Broadly*

Referring to FIG. 1 valve mechanism 2 has a shutoff valve 4. Valve 4 is connected, by means in the form of sprayer line 6, to a plurality of nozzle heads 8. Valve 4 controls the flow of fluid to said nozzle heads.

Shutoff valve 4 in its first position (FIG. 1) connects spray heads 8 to pump 10. At the same time, due to the back pressure of the nozzle heads, a selected portion of the fluid indicated by arrow 12 passes through pressure relief valve 14 to exit passage 15 and returns to reservoir 16 to agitate the fluid in the reservoir.

Shutoff valve 4 in its second position (FIG. 2) blocks sprayer line 6, and unblocks bypass passage 18 that is also connected to exit passage 15. Relief valve 14 is bypassed and pump 10 is connected directly to reservoir 16.

With the pump connected directly to the reservoir, the pump operates at practically zero pressure. As a result there is very little wear on the parts of the system because of the low pressure. And, there will be very little leakage since the system is at a low pressure, and because shutoff valve 4 physically blocks the entrance to sprayer line 6.

*Invention Specifically*

First the sprayer circuit will be discussed, and then the specific valve mechanism that is used in the sprayer circuit will be discussed.

*Sprayer Circuit*

Referring to FIG. 1 there is shown a schematic illustration of applicant's sprayer circuit during spraying.

Reservoir 16 is filled with fluid. Means in the form of conduit 20, pump 10, conduit 21, and passage 22 supplies fluid from reservoir 16 to shutoff valve 4. Conduit 20 is connected to the suction side of pump 10, and conduit 21 connects the outlet of the pump to entrance passage 22 and to shutoff valve 4.

Relief valve 14 is connected with entrance passage 22. The outlet of pressure relief valve 14 is connected to exit passage 15. And exit passage 15 is connected to reservoir 16 through conduit 17.

Shutoff valve 4 is connected to exit passage 15 by bypass passage 18 located down stream of relief valve 14.

Shutoff valve 4, when adjusted to its first position shown in FIG. 1, is effective to block bypass passage 18 and simultaneously connect entrance passage 22 to nozzle heads 8 for spraying. This also renders relief valve 14 operative to bypass fluid back to the reservoir.

Shutoff valve 4 is shown in the shutoff position in FIG. 2. Valve 4 has been moved to block sprayer line 6 and has at the same time unblocked bypass passage 18. Bypass passage 18 is connected to entrance passage 22. The fluid will now detour across relief valve 14 and pass through bypass passage 18, back to the reservoir. This renders the pressure relief valve unoperative.

*Valve Mechanism*

Valve mechanism 2 used in the sprayer circuit comprises a hollow valve body 24 that contains rotatable shutoff valve 4, and a series of partitions that divide the interior of the valve body into a number of passages.

The partitions form entrance passage 22, relief passage 26, bypass passage 18, spray passage 28 and, exit passage 15. Entrance passage 22 branches off into the relief, bypass and spray passages 26, 18, 28. The outlets of bypass and relief passages 18, 26 are connected to exit passage 15.

Pressure relief valve 14 is connected in relief passage 26. The pressure relief valve contains ball 30 that engages seat 32 in relief passage 26 so as to prevent fluid flow through the relief passage 26 from the exit passage 15 into the entrance passage 22. The ball 30 represents a movable valve element; and a spring 34, representing pressure means, exerts a closing pressure upon the ball 30 of such magnitude that the ball will be lifted from the seat 32 by normal operating pressure of spraying fluid delivered from the pump 10 to the nozzle head 8 while the valve core 38 of the shutoff valve 4 is adjusted to the position indicated by FIGS. 1 and 5. A screw threaded pressure regulator 36 adjusts the force of spring 34 on ball 30. Shutoff valve 4 (FIG. 6) is provided with a core 38 that has an axial intake opening 42 in its inner end, and two radial openings 44, 46 in communication with opening 42.

Two grooves 48 and 50 (FIG. 5) are provided to accommodate O ring seals 52, 52.

Shutoff valve core 38 is rotated by handle 39 to direct the fluid either to bypass passage 18 or spray passage 28 that is connected to sprayer line 6. The end of shutoff valve core 38 is drilled to receive a pair of radially projecting pins 54, 54 (FIG. 3). The pins will contact abutments or stops 56, 58 located on valve body 2. The stops limit the rotation of valve core 38 to a quarter turn or 90 degrees of rotation.

Radial openings 44, 46 in valve core 38 are also located 90 degrees apart. They are positioned relative to pins 54, 54 and stops 56, 58 so that in one position radial opening 46 is in alignment with spray passage 28 in the valve housing. In the other position, radial opening 44 is in alignment with bypass passage 18 in the valve housing.

Fluid entering axial opening 42 can be directed either to spray passage 28 when the sprayer is in operation, or to bypass passage 18 when spraying is stopped and the pump is only circulating the fluid for purposes of agitation.

*Operation*

Assume that pump 10 is operating, and pressure regulator 36 has been adjusted to permit relief valve 14 to bypass a selected amount of fluid to agitate the fluid in reservoir 16.

When handle 39 is rotated to the position shown in FIGS. 1 and 5, fluid flows from reservoir 16 through conduit 20, pump 10, conduit 21, entrance 22, axial passage 42, radial passage 46, spray passage 28, sprayer line 6, and out nozzle heads 8. Fluid will also flow past ball 30 through relief passage 26, exit passage 15, and through conduit 17 back to reservoir 16.

When handle 39 is rotated to the position shown in FIG. 2, fluid flows from reservoir 16, through conduit 20, pump 10, conduit 21, entrance passage 22, axial passage 42, radial passage 44, bypass passage 18, exit passage 15, and through conduit 17 back to reservoir 16.

*Summary*

Applicant has provided an agricultural spray apparatus that:
(1) Permits the pump to operate at very low pressure when spraying is stopped;
(2) Physically blocks the passage to the spray heads to prevent leakage when all the fluid is recirculating;
(3) Is very simple; and
(4) Contains few moving parts.

From the foregoing it will be apparent to those skilled in the art that changes and modifications may be made in the illustrated embodiment without departing from the spirit of the invention or from the scope of the appended claims.

I claim:
1. An agricultural spray apparatus comprising a fluid reservoir having separate inlet and outlet openings, a pump connected in fluid receiving relation with said reservoir outlet opening and having a fluid delivery passage; a nozzle head; and fluid distributing means selectively operable to direct the fluid discharge of said pump either partly to said nozzle head and partly to said reservoir inlet opening, or in its entirety to said reservoir inlet; said fluid distributing means comprising a shutoff valve having entrance, spray and exit passages in fluid communicating relation, respectively, with said pump delivery passage, nozzle head, and reservoir inlet, and an adjustable valve core operatively associated with said entrance, spray and exit passages so that upon adjustment of said valve core to a first position said entrance passage is connected with said spray passage and disconnected from said exit passage, and so that upon adjustment of said valve core to a second position said entrance passage is connected with said exit passage and disconnected from said spray passage; and a relief valve operatively connected in fluid receiving relation with said pump delivery passage and in fluid delivering relation with said reservoir inlet opening, said relief valve being operative to yield to normal operating pressure of spraying fluid delivered to said nozzle head while said valve core is in said first position.

2. An agricultural spray apparatus comprising; a fluid reservoir having separate inlet and outlet openings, a pump connected in fluid receiving relation with said reservoir outlet and having a fluid delivery passage; an internally partitioned valve body presenting an entrance passage connected in fluid receiving relation with said fluid delivery passage of said pump, an exit passage, relief and bypass passages each connecting said entrance passage with said exit passage, and a spray passage extending from said entrance passage and presenting a spray outlet opening of said valve body; an adjustable valve core operatively associated with said entrance, bypass and spray passages so that upon adjustment of said valve core to a first position said entrance passage is connected with said spray passage and disconnected from said bypass passage, and so that upon adjustment of said valve core to a second position, said entrance passage is connected with said bypass passage and disconnected from said spray passage; a nozzle head; a sprayer line connecting said nozzle head with said spray outlet opening of said valve body; a conduit connecting said exit passage of said valve body with said reservoir inlet opening; a movable valve element engageable with a seat in said relief passage so as to prevent fluid flow therethrough from said exit into said entrance passage; and resilient means exerting closing pressure upon said movable valve element of such magnitude that the latter will be lifted from said seat by normal operating pressure of spraying fluid delivered from said pump to said nozzle head while said valve core is in said first position.

References Cited in the file of this patent
UNITED STATES PATENTS

| | | |
|---|---|---|
| 2,545,712 | Stevenson | Mar. 20, 1951 |
| 2,596,074 | Hawes | May 6, 1952 |
| 2,619,163 | Wynne et al. | Nov. 25, 1952 |
| 2,632,458 | Slomer | Mar. 24, 1953 |
| 2,800,365 | Hodges | July 23, 1957 |
| 2,875,774 | Banker | Mar. 3, 1959 |

FOREIGN PATENTS

| | | |
|---|---|---|
| 176,781 | Germany | Oct. 19, 1906 |